United States Patent
Maul et al.

(10) Patent No.: US 6,327,838 B1
(45) Date of Patent: Dec. 11, 2001

(54) METHOD AND APPARATUS FOR FOLDING AN AIRBAG

(75) Inventors: Holger Maul, Grosse-Zimmern; Andreas Staub, Sulzbach; Markus Jost; Michael Doelfel, both of Weisbaden, all of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/390,428

(22) Filed: Sep. 7, 1999

(30) Foreign Application Priority Data

Sep. 14, 1998 (DE) .............................. 198 42 026

(51) Int. Cl.$^7$ ..................... B65B 63/04
(52) U.S. Cl. ............... 53/429; 280/728.1; 280/743.1; 493/449
(58) Field of Search .................. 280/728.1, 743.1; 53/429; 493/405, 451, 458, 449, 243, 244

(56) References Cited

U.S. PATENT DOCUMENTS

| | | | |
|---|---|---|---|
| 5,456,651 | * | 10/1995 | Baker et al. . |
| 5,690,358 | * | 11/1997 | Marotzke . |
| 5,755,078 | * | 5/1998 | Hurtig, Jr. et al. . |
| 5,791,532 | * | 8/1998 | Roehl et al. . |
| 5,984,852 | * | 11/1999 | Heudorfer et al. . |
| 6,171,228 | * | 1/2001 | Marotzke et al. . |
| 6,248,052 | | 6/2001 | Kleeberger et al. ......... 493/374 |

FOREIGN PATENT DOCUMENTS

| | | |
|---|---|---|
| 19535565 | 3/1997 | (DE) . |
| 19536625 | 3/1997 | (DE) . |
| 19546232 | 6/1997 | (DE) . |
| 19648654 | 5/1998 | (DE) . |
| 29811042 | 3/1999 | (DE) . |
| 9301103 | 11/1997 | (JP) . |
| 9712782 | 4/1997 | (WO) . |
| 9822311 | 5/1998 | (WO) . |

* cited by examiner

*Primary Examiner*—Eugene Kim
(74) *Attorney, Agent, or Firm*—Lonnie Drayer

(57) ABSTRACT

A method for folding an airbag for an airbag module involves straightening the airbag out in the direction of a straightening axis, starting from a gas inlet opening of the airbag. The airbag in the straightened-out state, or during the straightening-out operation, is pushed into a guide sleeve in the direction of the straightening axis. The airbag is then pushed together, and in the method folded, within the guide sleeve in the longitudinal direction thereof, in the direction of the straightening axis. An apparatus for folding an airbag for an airbag module has a straightening ram which, for the purpose of straightening out the airbag, can be pushed into the latter in the direction of a straightening axis by way of a gas inlet opening which has a guide sleeve. The guide sleeve is arranged coaxially with respect to the straightening ram. The straightening ram can be pushed along the straightening axis. The inner cross-sectional surface area of the guide sleeve is greater than the cross-sectional surface area of the straightening ram, and has a folding ram which, for the purpose of pushing the airbag together, can be moved within the guide sleeve, along the straightening axis.

20 Claims, 9 Drawing Sheets

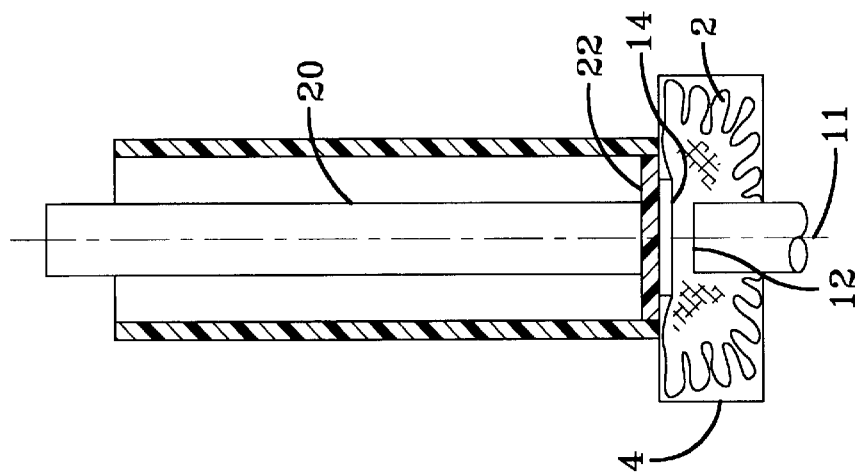
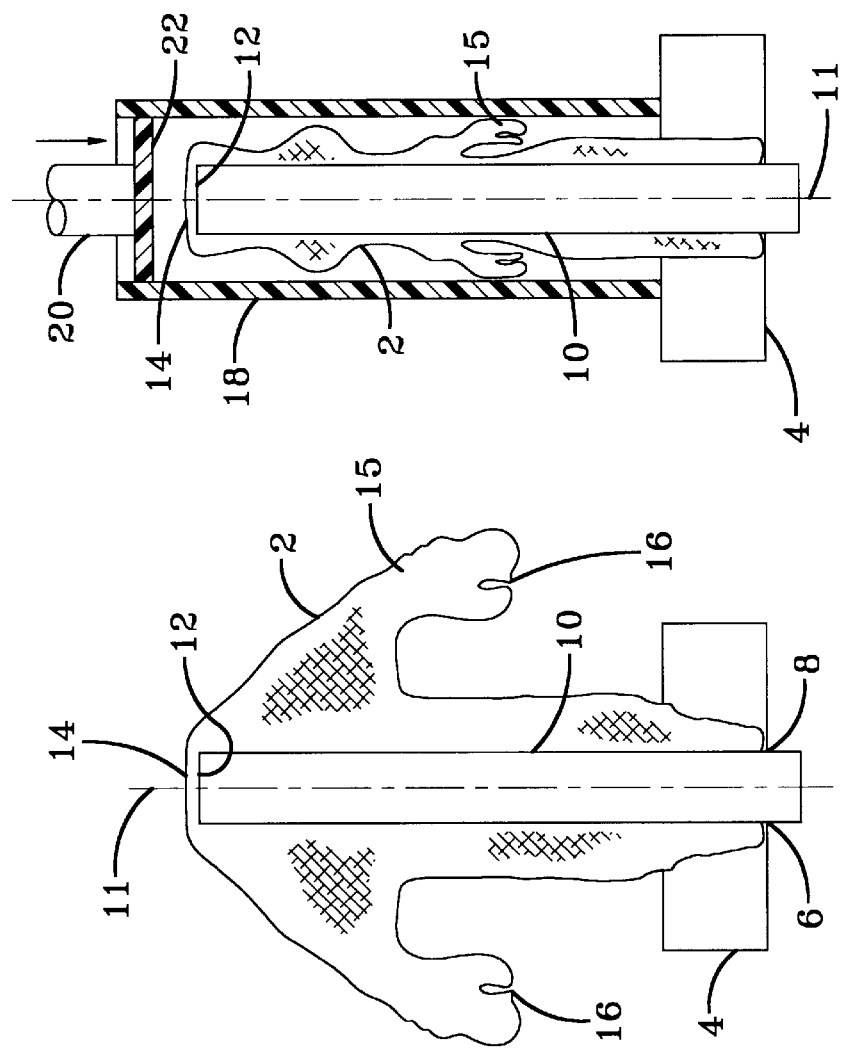

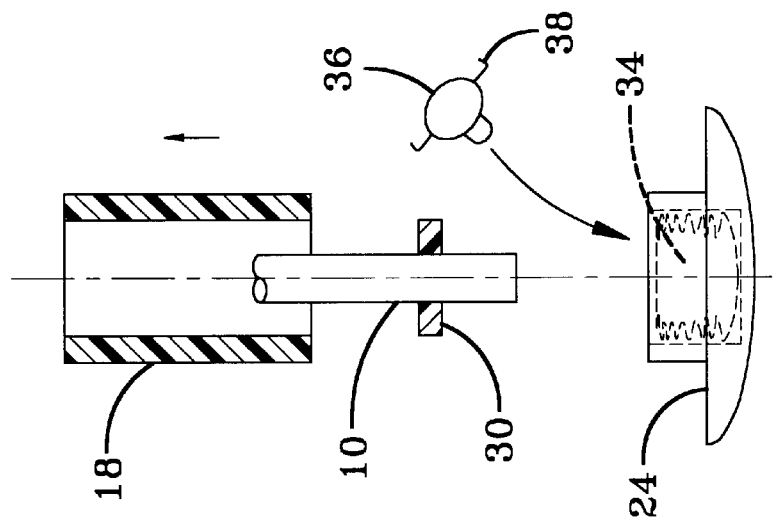
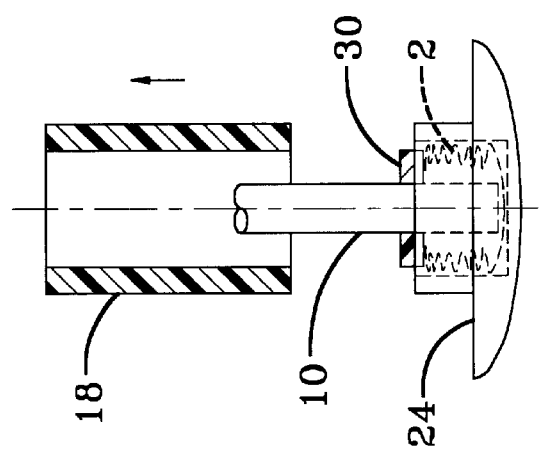
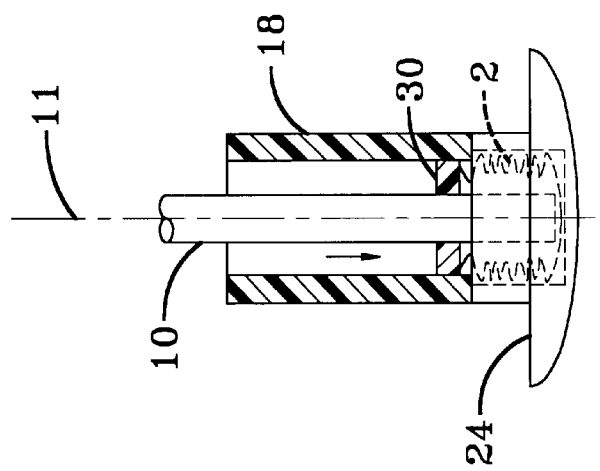

METHOD AND APPARATUS FOR FOLDING AN AIRBAG

FIELD OF THE INVENTION

The present invention relates to a method and an apparatus for folding an airbag.

BACKGROUND OF THE INVENTION

Airbags in airbag modules are usually arranged in a folded state in an airbag housing behind a covering. In the event of a crash the airbag is inflated, i.e. filled with a gas. The airbag is deployed to form a gas-filled cushion that can damp the impact of the vehicle occupant. Up until now, folding of the airbag has been performed such that the airbag has been spread out flat and then folded specifically at predetermined points resulting in a folded arrangement. This folded arrangement is then arranged in the airbag module near the gas generator, or a gas-supply device, such that it is located in the direction of deployment of the airbag, i.e. the folded airbag is located between the gas generator and the vehicle occupant.

The methods which have been used heretofore for folding an airbag have a number of disadvantages. For example, a very large amount of space is necessary for the purpose of folding the airbag, since the entire airbag must first of all be spread out flat. Furthermore, for automated folding of the airbag, there is a need for a relatively complicated installation, which has to be adapted individually in each case to different airbag shapes and the specific folding sequences thereof. Moreover, such complicated folding can only be performed at a limited speed.

An object of the invention is to provide a method and an apparatus for folding an airbag for an airbag module and permit simplified and quicker folding of the airbag and a smaller amount of installation space for the apparatus.

In the method according to the invention, the airbag is first of all straightened out in the direction of a straightening axis, starting from a gas inlet opening of the airbag. In the straightened-out state or during the straightening-out operation, the airbag is pushed or drawn into an outer guide device in the direction of the straightening axis, and then the airbag is pushed together, and in the method folded up, within the outer guide device in the longitudinal direction thereof, i.e. in the direction of the straightening axis. In this method, for the folding operation, the airbag is straightened out along an axis rather than being spread out flat resulting in a three-dimensional arrangement. The subsequent folding operation does not take place in a specific manner, i.e. the airbag is not folded along precisely predetermined folding lines. Rather, folding is brought about arbitrarily by the airbag being pushed together in the outer guide device. The airbag is folded in the manner of an accordion, the fold lines being produced arbitrarily. This folding method permits the airbag to be folded considerably more easily and quickly since it is possible to dispense with numerous individual, precisely defined folding operations along predetermined folding lines. Furthermore, the method does not require much space since the airbag does not have to be spread out flat, but rather is straightened out along a line instead.

This folding method produces a folding pattern with main folding lines that start from a central region, which is located in the vicinity of the straightening axis, and run essentially radially outwards in a straight line to the periphery of the airbag. It is also possible to achieve folding in the case of which the main folding lines run essentially radially on the front layer of the material, which is directed toward the vehicle occupant, while they run essentially concentrically, preferably parallel to the periphery of the airbag and/or of the gas inlet opening, on the rear layer of material, which is directed away from the vehicle occupant.

The straightening axis advantageously runs essentially perpendicularly with respect to a front surface of the airbag. The front surface of the airbag in this case is the impact surface of the airbag, which, when the airbag is installed in a motor vehicle, is directed toward a vehicle occupant when the airbag is inflated. Since the straightening axis runs essentially perpendicularly with respect to said front surface, it is possible to ensure, on the one hand, a straightforward folding operation and, on the other hand, at a later stage, when the airbag is filled with gas by a gas generator, also a specific and reliable deployment operation of the airbag, in the case of which first of all the front surface moves toward and comes into contact with the vehicle occupant.

During the folding operation, the airbag is expediently fixed preferably in the region of its gas inlet opening. This makes it possible to ensure, during the folding operation, that the gas inlet opening remains free and is later accessible to be fitted on a gas-supply device or a gas generator.

The airbag is preferably pushed together in the outer guide device by means of a folding ram. In this case, the folding ram moves within the outer guide device along the longitudinal axis thereof, i.e. in the direction of the straightening axis, and pushes the straightened-out airbag together such that it folds up in the manner of an accordion. In this case, the individual folds or creases are produced of their own accord during the folding operation without precise folding lines being predetermined. Despite folding lines that are not precisely predetermined, a satisfactory, precisely controlled deployment of the airbag at a later stage can nevertheless be ensured.

For the purpose of straightening out the airbag, a straightening ram is advantageously pushed into the latter in the direction of the straightening axis, starting from the gas inlet opening, and comes into abutment, by way of its end surface, against the inside of a section of the airbag which is located opposite the gas inlet opening. This allows the airbag to be straightened out to the full extent. The airbag is straightened, by the straightening ram being pushed in, until further movement of the straightening ram is restricted as a result of limiting bands, tear seams, etc. arranged in the airbag or by the outer sheath of the airbag itself. In this case, the straightening ram advantageously moves in a straightening direction, which corresponds, to the later main deployment direction of the airbag. This means that the airbag is straightened in its main deployment direction. This makes it possible to ensure, during the later pushing-together operation, that the folding-up operation of the airbag takes place in reverse order to the operation in which the airbag has to unfold again at a later stage when being inflated.

In the folding pattern produced during the subsequent folding operation, the central region from which the main folding lines, i.e. the creases produced during folding, extend radially outwards essentially in a straight line is that region of the airbag which butts against the end surface of the straightening ram. Essentially no folding lines are then formed in this region. The folding lines may run in a precisely radial manner toward the center point of this region. However, it is also possible for them to run such that they border tangentially on the periphery of said abutment surface, which in the case of a circular end surface of the straightening ram is likewise essentially circular, and, starting from the periphery of the abutment surface, extends essentially in a straight line to the outer circumference of the airbag.

During the straightening-out operation of the airbag, the straightening ram is preferably simultaneously pushed into the outer guide device. This allows the time required for the folding-up operation to be reduced since the operations of straightening out the airbag and pushing it into the sleeve take place, at least in part, at the same time. Furthermore, the action of the straightening ram being pushed into the outer guide device with the airbag surrounding it achieves the situation where even regions of the airbag which cannot straighten out to the full extent as a result of, for example, limiting bands or seams, these are the peripheral or outer regions of the airbags for example, are likewise arranged in the outer guide device in the straightening direction or pushing-in direction.

Once the straightening ram has been pushed in, a positioning device is preferably advanced along the outside of the airbag, parallel to the straightening ram, starting form the gas inlet opening. This means that, before the airbag is folded, the rear region of the airbag, which surrounds the gas inlet opening, is positioned against the straightening ram. Once the airbag has been pushed together and folded up in the guide device, it is thus ensured that the parts of the airbag which are directed toward the vehicle occupant when the airbag is inflated are located on the outside or at the front, as seen in the deployment direction, in the folded airbag assembly. This means that, during the inflation operation, these parts of the airbag can spread out toward a vehicle occupant very quickly and without obstruction, as a result of which sufficient protection for the vehicle occupant can be ensured very quickly.

The positioning device is advantageously designed as a sleeve, which is concentric with the straightening ram or in the form of a plurality of bars, which are arranged around the straightening ram. Such a device can ensure that the airbag is correctly positioned against the straightening ram in its rear region. In this case, the distance between the sleeve or the bars and the straightening ram has to be dimensioned such that that part of the airbag which is to be placed in position can be received between the positioning device and straightening ram without getting caught or being damaged, and is positioned against the straightening ram as smoothly and uniformly as possible.

In a further embodiment, once it has been straightened out in the direction of the straightening axis, starting from the gas inlet opening, the airbag is drawn into the outer guide device in a direction counter to the movement direction of the straightening ram when the airbag is straightened out, the straightening ram accordingly being moved along in the same direction in order to keep the airbag in its straightened-out state. This achieves an effect similar to that achieved by the additional positioning device, although there is no need for any additional method steps or equipment. When the airbag is drawn into the guide device, part of the front side of the airbag, said front side being located opposite the gas inlet opening, is positioned against the straightening ram in the vicinity of the part which comes into contact with the end surface of the straightening ram. Furthermore, the peripheral connecting seams of the airbag are also arranged in the vicinity of the front side of the airbag. This can achieve the situation where, once the airbag has been pushed together in the guide device, the airbag is folded such that the front side of the airbag and the regions of the peripheral seams are located at the top. This means that when the airbag is deployed, when it is filled with gas, said regions are located at the front, as seen in the deployment direction, with the result that said regions, with which a vehicle occupant comes into contact in the event of a crash, are the first to unfold, with the result that good protective action is achieved very quickly.

During the pushing-together operation of the airbag, the folding ram is advantageously moved counter to the pushing-in direction of the straightening ram, while the straightening ram is simultaneously moved back preferably at the same speed. As a result of this movement sequence, the airbag is folded toward the gas inlet opening. This makes it possible to ensure that part of the airbag front surface, which is usually located opposite the gas inlet opening, is the last to be pushed onto the already folded airbag. This means that, during the later deployment of the airbag, first of all this relatively small and light part of the front surface is accelerated and then is moved toward a vehicle occupant. This movement of the front surface, or part of the front surface, is slowed down, during the deployment, by the still folded regions of the airbag, this resulting in quicker and predominantly radial and/or peripheral unfolding of the airbag.

Furthermore, during the pushing-together operation, it is possible for the folding ram to be moved in the pushing-in direction of the straightening ram, while the straightening ram is preferably not moved at all. In this procedure, the airbag is pushed together, and folded, toward its front surface. This can also ensure that the front surface of the airbag is the last to rest on the folded part of the airbag, since the front surface advantageously butts against the straightening ram during the entire folding operation. Meanwhile, the rest of the airbag is pushed together, and folded, along the outer walls of the straightening ram up to the front or end side thereof, against which the front side of the airbag butts. In this method, the airbag is preferably fastened on the folding ram in the region of the gas inlet opening, with the result that this part comes to be located at that end of the airbag, which is folded in the manner of an accordion, which is opposite the front surface. This means that the gas inlet opening is easily accessible, with the result that it can easily be arranged on a gas generator or a gas-supply device at a later stage.

Following the straightening-out operation and during the pushing-together operation the outside of that section of the airbag which butts against the end surface of the straightening ram is advantageously kept in contact with the folding ram or with part of a covering of the airbag module. This makes it possible for part of the airbag, preferably part of its front surface, to be clamped in between the straightening ram and the folding ram, or part of the covering of the airbag module, during the folding operation. This makes it possible to ensure that, following the folding operation, this part of the airbag is the last to rest on the folded airbag arrangement and can be arranged in the immediate vicinity of a gas generator. During the later inflating operation of the airbag, it is then possible to ensure that first of all this section, which was clamped in between a covering or the folding ram and the straightening ram, is set in motion without obstruction, with the result that, starting from this region, the airbag is unfolded during deployment in a uniform and controlled manner. The airbag is clamped in between the straightening ram and the covering if the airbag is folded directly inside a covering of an airbag module. At a later stage, in the installed state, the covering is then directed toward the vehicle occupant and has a corresponding tear seam, through which the airbag can deploy in the direction of the vehicle occupant. Following the folding-up operation an appropriate gas-supply device or a gas generator is introduced into the covering from the rear side. Another method variant is to fold the airbag inside an airbag housing. In this case, the airbag is first fastened on the airbag housing at the peripheral regions of the gas inlet opening. In this folding-up method, a region of the airbag is clamped in between the straightening ram and the folding ram and the folding ram is moved in the direction of the airbag housing. It is also possible in this method to ensure that the previously clamped-in region of the airbag is the last to rest on the other, already folded regions of the airbag. Last of all, the covering of the airbag module is fitted over this region of the airbag.

That section of the airbag against which the straightening ram butts by way of its end surface is advantageously part, and preferably a central part, of the front surface of the airbag. However, it is also possible for the straightening ram to straighten the airbag eccentrically or asymmetrically, it being possible for the airbag to be given an asymmetrical preferential outlet direction. This ensures that the section of the airbag which butts against the end surface of the straightening ram is secured and guided in a defined manner during a pushing-together and folding-up operation. Following the folding operation, the section of the airbag which butts against the end surface of the straightening ram is located directly behind the covering of the airbag module. During the later deployment of the airbag this section of the airbag will thus first of all break through the covering and move toward a vehicle occupant. This section of the airbag, which is advantageously the central region of the front surface, will be the first to come into contact with the vehicle occupant, while the airbag regions extending radially around this region come into contact with the vehicle occupant subsequently one after the other, i.e. starting from its central region, the airbag rolls on the vehicle occupant, advantageously his/her face. This makes it possible to avoid friction between the airbag and vehicle occupant, which friction could possibly result in grazing, since the vehicle occupant comes into contact with the airbag progressively in a precisely defined manner. This is particularly important if, during the deployment of the airbag, the vehicle occupant is not in a precisely defined position, i.e. in so-called out-of-position cases. This reduces the risk, which arises in the case of conventionally folded airbags, of the airbag getting caught, for example, beneath the vehicle occupant's chin during the deployment and minimizes the extension of a vehicle occupant's neck. The restraining action of the folded part of the airbag, which is still located in the airbag housing at the beginning of the deployment, slows down the emergence of the front surface. This results in this region of the airbag emerging to a correspondingly small depth, and the airbag then preferably quickly spreads out radially in front of a vehicle occupant. This reduces the risk of injury for the vehicle occupant during the deployment of the airbag.

During the pushing-together operation it is a desirable that a spacer be arranged in the airbag, preferably in the vicinity of the gas inlet opening. Such a spacer is necessary if a gas generator or a gas-supply device is not to be introduced into the airbag until after the folding-up operation. The spacer keeps free the installation space required for the gas generator or the gas-supply device. The airbag can thus easily be folded precisely such that it is later arranged, in the installed state, around the gas generator or the gas-supply device.

It is further preferred for the straightening ram to assume the function of the spacer. There is thus no need for any additional method step for introducing a spacer since the cavity necessary for the gas generator is kept free in the interior of the folded airbag by the straightening ram.

The airbag is preferably pushed out of the outer guide device into an airbag housing or into a covering for an airbag module. This makes it possible to ensure that, during introduction of the folded airbag into a covering or into an airbag housing, the airbag does not come out of its folded state prematurely.

It is further preferred for the airbag to be pushed into the airbag housing or the covering for the airbag module during the folding operation. This avoids an additional operation for introducing the folded airbag into the airbag housing or into a covering since the airbag is folded directly into the covering or the housing, by virtue of being pushed together in the sleeve and forced into the housing or the covering.

The apparatus for folding an airbag comprises a straightening ram which, for the purpose of straightening out the airbag, can be pushed into the latter in the direction of a straightening axis, by way of a gas inlet opening, also comprises a guide sleeve which is arranged coaxially with respect to the straightening ram and into which the straightening ram can be pushed along the straightening axis, it being the case that the inner cross-sectional surface area of the guide sleeve is greater than the cross-sectional surface area of the straightening ram, in particular greater by such an extent that the airbag can be folded up between the straightening ram and an inner wall of the guide sleeve, and also comprises a folding ram which, for the purpose of pushing the airbag together, can be moved within the guide sleeve along the straightening axis. This apparatus is suitable, in particular, for carrying out the above-described method. It has the advantage that it may be of extremely compact configuration since all the movements necessary for folding the airbag take place along one and the same axis, i.e. along the straightening axis, along which the airbag is straightened out. For as space-saving an arrangement of the apparatus as possible, the straightening axis runs, as far as possible, vertically. The guide sleeve and the rams are preferably of round design, but may also be of any other desired shape, which may be adapted, in particular, to a specific shape of the airbag or of the airbag housing or of the airbag-module covering. The standing surface of the apparatus according to the invention need not be much greater than the airbag housing, or the covering of an airbag module itself, since, for the purpose of folding the airbag, the latter is straightened out along an axis, i.e. a line in the direction perpendicular to the airbag housing or the covering, rather than there being any need for it to be spread out flat. Since in this case the airbag is straightened out into the guide sleeve, the cross-sectional surface area of the straightening ram is designed to be smaller than the inner cross-sectional surface area of the guide sleeve, with the result that the straightened-out airbag comes to be located between the straightening ram and the inner walls of the guide sleeve.

The folding ram preferably has a cross-sectional surface area that corresponds to the inner cross-sectional surface area of the guide sleeve. Sufficient play between the folding ram and the guide sleeve is nevertheless ensured in this case, in order that the folding ram can be moved easily in the guide sleeve along the longitudinal axis thereof. However, the folding ram butts so closely against the inner wall of the guide sleeve that it is not possible for regions of the airbag to pass into the gap between the folding ram and the inner wall of the guide sleeve, which could result in the airbag being damaged and the apparatus being blocked.

The folding ram advantageously has, preferably in its center, an opening through which the straightening ram extends. This arrangement makes it possible for the airbag, during folding inside a covering cap or covering, first of all to be straightened out, starting from its gas inlet opening, and then, likewise starting from the gas inlet opening, to be pushed together toward the opposite side of the airbag, i.e. toward the front surface. In this case, the folding ram moves along the straightening ram, which is guided in the opening of the folding ram and is preferably not moved at all.

Fastening devices are expediently provided for fastening the airbag preferably in the region of its gas inlet opening. This allows the airbag to be retained securely during the folding operation, and it is ensured that the gas inlet opening of the folded airbag is freely accessible, in order to be connected to a gas generator or a gas-supply device.

The fastening devices are preferably provided on the folding ram. This makes it possible, when the folding ram is displaced along the straightening ram for the pushing-together and folding-up operations for the airbag to be firmly secured on the folding ram, with the result that a section thereof is freely accessible for later fastening on an airbag housing. This section for fastening the airbag is advantageously located in the vicinity of the gas inlet opening, with the result that the latter can be fixed precisely on a gas-supply device or a gas generator.

It is also possible for devices to be provided in order to keep an airbag housing or a covering of an airbag module in contact with the guide sleeve. This means that the guide sleeve is advantageously forced up against the airbag housing or the covering, with the result that, during the folding-up operation of the airbag, the latter can be forced or folded directly into the airbag housing or the covering of the airbag module. This makes it possible to avoid, at a later stage, further operations for introducing the folded airbag into the airbag housing or the covering.

There is preferably provided a positioning device in the form of a sleeve or of a plurality of bars which are arranged coaxially, concentrically and at a distance from the straightening ram and, for the purpose of positioning the airbag against the straightening ram, can be moved parallel to the straightening ram. Such an apparatus makes it possible for a sub-region of the airbag to be positioned against the straightening ram before the airbag is folded. In order to achieve folding in the case of which the regions of the airbag which are directed toward a vehicle occupant when the airbag is deployed are located at the top of the folded assembly. This means that, during inflation of the airbag, these regions are the first to unfold, doing so without obstruction, as a result of which the greatest possible level of protection for a vehicle occupant can be achieved very quickly.

BRIEF DESCRIPTION OF THE DRAWINGS

The invention is described hereinbelow by way of example with reference to accompanying drawings.

FIGS. 1A to 1C show a first embodiment of the apparatus and a first variant of the folding method according to the invention.

FIGS. 2A to 2F show a second embodiment of the apparatus and a second variant of the folding method according to the invention.

DETAILED DESCRIPTION OF THE INVENTION

Figure 2C:
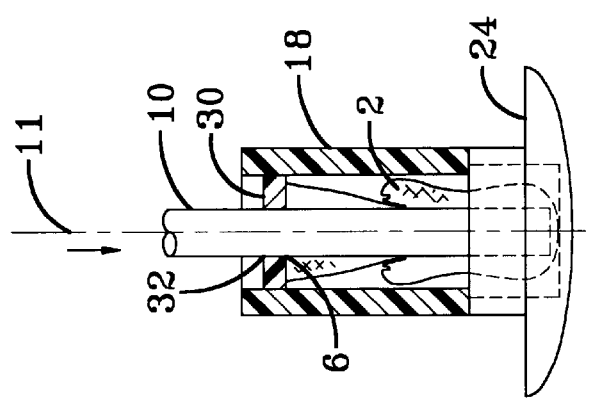

A first variant of the method according to the invention and a first embodiment of the apparatus according to the invention will be described with reference to FIGS. 1A to 1C. First an airbag 2 is fastened on an airbag housing 4 having a gas inlet opening 6. The airbag is advantageously fastened to the airbag housing in the vicinity of a corresponding opening 8 in the housing 4. At a later stage, a gas generator or a gas-supply device (not shown here) can be introduced through the two openings. Then a straightening ram 10 is introduced into the interior of the airbag through the gas inlet opening 6 and the opening 8. In this embodiment, the straightening ram 10 moves essentially perpendicularly with respect to the plane defined by the airbag housing 4 and, in particular, the opening 8. When the straightening ram 10 has been pushed into the airbag to a sufficient extent, it comes into contact by way of its front or end surface 12, with the side 14 of the airbag 2, said side being located opposite the gas inlet opening 6. If the airbag 2 is arranged symmetrically, i.e. in particular in a rotationally symmetrical manner about the straightening axis 11, along which the straightening ram 10 is moved, the end surface 12 of the straightening ram 10 comes into contact with a central region of the front surface 14 of the airbag 2. The straightening ram 10 is preferably pushed into the airbag 2 until the latter is straightened out to the full extent, i.e. cannot be straightened out any further. However, it is also possible for the straightening ram to be stopped at any desired position prior to this. Further straightening out can be restricted, for example, by seams, limiting bands, etc. arranged in the airbag. This means that there may be regions of the airbag 2 that are not straightened out to the full extent. These are, for example, the peripheral regions 15 in the vicinity of the peripheral seam 16 of the airbag 2 and comprises two layers of fabric or material, being sewn together by said peripheral seam.

FIG. 1B shows a second step of the method, in which a guide sleeve 18 is pushed over the straightening ram 10 with the straightened-out airbag. In this case, the non-straightened regions 15 of the airbag 2 in the vicinity of the peripheral seam 16 are also aligned in the direction of the straightening axis 11. The guide sleeve 18 is arranged coaxially with respect to the straightening ram 10 and the straightening axis 11. As is also the case with the straightening ram 10, the guide sleeve 18 is preferably of round design, i.e. the guide sleeve is a round tube. However, it is also possible for the guide sleeve and the straightening ram to be of other shapes, which can be adapted to the respective configuration of a specific airbag or of a specific airbag housing 4. The guide sleeve 18 is moved over the straightening ram 10, counter to the movement direction of the latter, toward the airbag housing 4. It is also possible for this movement to take place during the straightening-out operation of the airbag, with the result that the sequence is accelerated. When the guide sleeve 18 has been pushed on to the full extent, and the straightening ram 10 has been pushed into the airbag to the full extent, with the result that the airbag has been straightened to the full extent, the airbag comes to be located between the inner walls of the guide sleeve 18 and the periphery of the ram 10. Arranged at that end of the guide sleeve 18 which is directed away from the airbag housing 4 is a folding ram 20 whose front region 22 is designed such that it fits precisely into the interior of the guide sleeve. The folding ram 20 can likewise be moved along the straightening axis 11. For the folding operation, then, the folding ram 20 is moved in the folding direction, in the guide sleeve 18, toward the end surface 12 of the straightening ram 10 and the airbag housing 4. In this case, the front region 22 of the folding ram first of all comes into contact with the front section 14 of the airbag 2, which is thus clamped in between the folding ram 20 and the end surface 12 of the straightening ram 10. The folding ram 20 is then moved further toward the airbag housing 4, the straightening ram 10 being moved back at the same speed, i.e. being moved in the same direction as the folding ram. In this way, the front surface 14 of the airbag, which is clamped in between the folding ram 20 and the straightening ram 10, is moved in the direction of the airbag housing 4. The periphery of the folding ram, and/or the front region 22 thereof, butt directly against the inner wall(s) of the guide sleeve 18. During its movement in the direction of the airbag housing, the folding ram then carries along all parts of the airbag one after the other and pushes them in the direction of the airbag housing and, finally, into the same. As a result, essentially accordion-like folding of the airbag 2 forms automatically. This folding is not precisely predetermined, i.e. there are no precise folding lines defined. However, the airbag 2 folds up such that it unfolds without difficulty during the later deployment operation, since the later deployment likewise takes place along the straightening axis 11, in precisely the reverse order to the folding operation. This makes it possible to ensure that, during deployment the unfolding airbag 2 does not get jammed and, consequently, the deployment can take place quickly and without any friction arising.

FIG. 1C shows a third step of the first method variant. In FIG. 1C, the folding ram 20 has been moved in the guide sleeve 18, by way of its end or front surface 22, right up to the adjacent airbag housing 4. In this case, the airbag 2 has been forced in its entirety into the airbag housing 4 with accordion-like folding. Since, in this operation, the straightening ram 10 has been carried along at the same time, the latter, then, is still located in the airbag housing 4 and is surrounded by the folded airbag 2, with the result that the straightening ram 10 forms a spacer which forms a cavity for a gas generator or a gas-supply device which is to be introduced at a later stage. The front section 14 of the airbag 2 has been guided between the front surface 22 of the folding ram 20 and the end surface 12 of the straightening ram 10 during the entire folding-up operation, with the result that it comes to be located, in the folded state, directly above the cavity for the gas generator. This achieves the desired effect during the later deployment operation, that first this front section 14 of the airbag 2 is set in motion and then it draws the other sections of the airbag after it. This achieves the desired effect during the later deployment operation that first the front section 14 comes into contact with the vehicle occupant and the other sections of the airbag 2 roll onto the vehicle occupant one after the other, starting from the front section 14, with this minimizing the friction between the vehicle occupant's skin and the airbag, with the result that the risk of injury, for example in the form of grazing, can be reduced. Furthermore, the front section 14, which moves first of all during the inflating operation, is slowed down by a restraining force of the still folded airbag 2, this preferably resulting in radial unfolding of the airbag 2.

A second variant of the method according to the invention is described below with reference to FIGS. 2A to 2F. Whereas in the first variant the airbag is folded inside an airbag housing, on which there is then later positioned a covering which closes off the airbag module from the interior of a motor vehicle, in the second variant the airbag is folded directly into the covering of the airbag module and then a gas generator or a gas-supply device is fitted on said covering, from the rear side, by way of an appropriate carrier. The same parts are designated by the same reference characters hereinbelow.

Figure 2B:
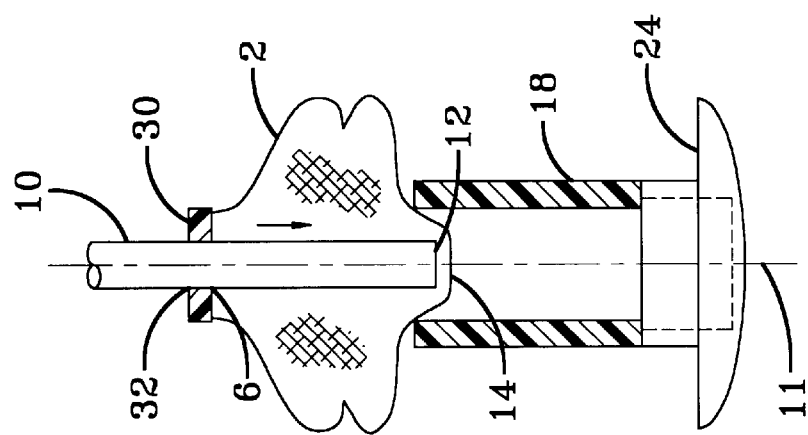
Figure 2A:
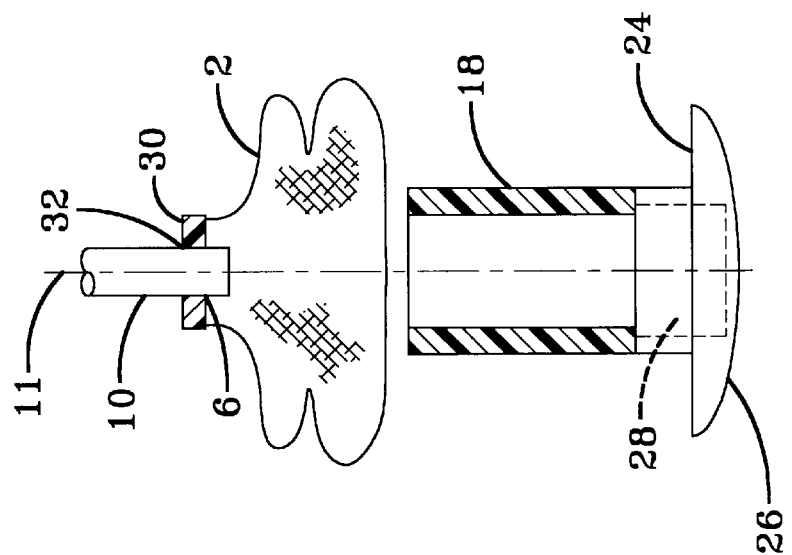

FIG. 2A shows a first step of the second method variant. In this case, the covering 24 of the airbag module has its front side 26 oriented downward, said front side later being directed toward the vehicle occupant in the interior of a motor vehicle. A cavity 28 is formed toward the rear side of the covering 24, the folded airbag, and later the gas generator or a gas-supply device as well, being introduced into said cavity. The guide sleeve 18 is fitted on the periphery of said cavity 28, which is open toward the rear side. This orientation of the covering 24, i.e. with its front side 26 downward, is not absolutely necessary, but is advantageous since it permits a particularly space-saving folding operation and a particularly space-saving folding apparatus. In this embodiment, an annular folding ram 30 is provided, and this has, in its interior, an opening 32 through which the straightening ram 10 extends. In this case, the straightening ram 10 is advantageously guided in the opening 32. The airbag 2 is fastened on the folding ram 30 in the region of its gas inlet opening 6. In the first step, which is shown in FIG. 2A, the straightening ram 10, the folding ram 30 and the airbag 2 are located outside the guide sleeve 18.

FIG. 2B shows a second step of the second method variant. The straightening ram 10 is first of all moved through the opening 32 of the folding ram 30 in the direction of the straightening axis 11, and then comes into contact, by way of its end side 12, with a front section 14 of the airbag 2, said front section being located opposite the gas inlet opening 6, as a result of which the airbag 2 is straightened upon further movement of the straightening ram 10 in this direction. In this case, some of the airbag 2 is already drawn or pushed into the guide sleeve 18 since the straightening ram 10 passes into the latter.

FIG. 2C shows a third step of the sequence. The airbag 2 has been straightened out to the full extent, i.e. the straightening ram 10 has been moved along the straightening axis 11 with respect to the folding ram 30 to such an extent that, as a result of the configuration of the airbag, i.e. the length of the layers of material or seams, limiting bands, etc., the straightening ram cannot be moved any further. Subsequently, the position of the straightening ram 10 with respect to the folding ram 30 remains constant, and the two are pushed into the guide sleeve 18, along the straightening axis 11, together. FIG. 2C shows the state in which the straightening ram 10, the folding ram 30 and the straightened-out airbag 2 have been pushed into the guide sleeve 18 to the full extent. In this case, the front section 14 of the airbag 2 moves into direct contact with the coupling 24 and is secured between the latter and the end surface 12 of the straightening ram 10. Thereafter, the folding ram 30 is moved with respect to the straightening ram 10, i.e. the folding ram is displaced on the straightening ram 10 in the direction of the straightening axis 11, with the result that the folding ram moves toward the covering 24. In this method, the airbag 2, which is located between the straightening ram 10 and the inner walls of the guide sleeve 18, is pushed together, in which case it is automatically folded in the manner of an accordion. There are no precise folding lines to be determined in this case, i.e. the folding operation takes place arbitrarily. However, as has been described above, the airbag can later be unfolded without difficulty during the deployment since the unfolding takes place in the same direction as the folding-up operation.

FIG. 2D shows the step in which the airbag 2 has been pushed together and folded to the full extent by the folding ram 30. In this state the straightening ram 10 has not changed its position, i.e. the front section 14 of the airbag 2 is still forced up against the covering 24 by the straightening ram 10. The displacement of the folding ram 30, which may also be designed as part of the airbag housing, has pushed or folded the airbag 2 into the cavity 28 of the covering 24 to the full extent. Since the straightening ram 10 has not changed its position, it serves as a spacer and provides a cavity in the folded airbag 2 into which a gas generator or a gas-supply device can be introduced at a later stage. In this case, the front section 14 of the airbag 2 then comes to be located directly above the gas generator or the gas-supply device. Therefore, this front section is the first to be set in motion and/or accelerated during the deployment of the airbag.

As shown in FIG. 2E, the guide sleeve 18 is then removed from the covering 24 and the folded airbag 2 continues to be secured in the covering by the folding ram 30 and the straightening ram 10. Still referring to FIG. 2F, the straightening ram 10 and the folding ram 30 are then also moved back in the direction of the straightening axis 11. Put another way, the straightening ram and the folding ram are released from the covering and moved away, with the result that only the folded airbag remains in the cavity 28 in the covering 24. At the point at which the straightening ram 10 was previously located, there now remains a cavity 34 into which a gas generator 36 can be introduced. The gas generator 36 is connected to a carrier 38 by way of which it is fastened on the covering 24, this producing a complete airbag module which can then be installed in a motor vehicle.

Figure 3A:
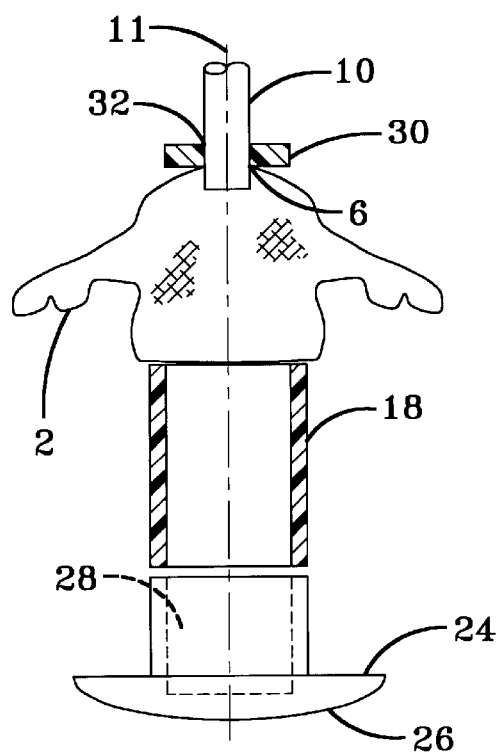
FIGS. 3A to 3G show a third embodiment of the apparatus and a third variant of the folding method according to the invention.
Figure 3B:
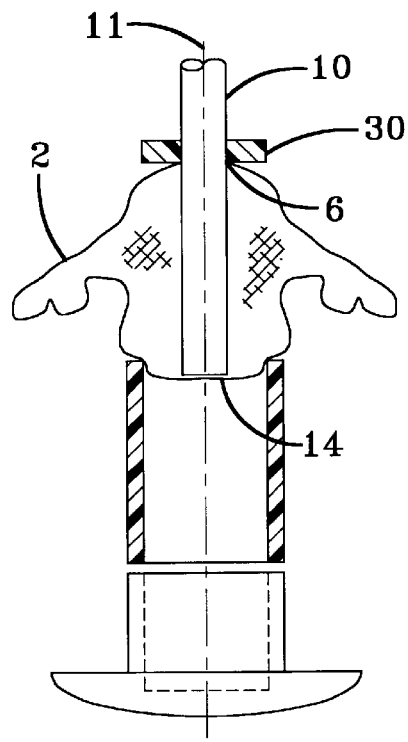

FIGS. 3A to 3G show a third variant of the method according to the invention. The method variant illustrated in FIGS. 3A to 3G corresponds essentially to the method described with reference to FIGS. 2A to 2F. As can be seen in FIG. 3A, the arrangement of the covering 24, of the guide sleeve 18, of the airbag 2, of the folding ram 30 and of the straightening ram 10 corresponds to the arrangement shown in FIG. 2A. The guide sleeve 18 is fitted on the open side of the cavity 28, which is located opposite the front side 26 of the covering 24. In the region of its gas inlet opening, the airbag 2 is fastened on the folding ram 30, which is of annular configuration. The straightening ram 10 extends through an opening 32 in the folding ram 30. As shown in FIG. 3B, which corresponds to FIG. 2B, the straightening ram 10 is first moved in the direction of the straightening axis 11, through the opening 32 of the folding ram 30, into the interior of the airbag 2. The straightening ram 10 comes into contact, by way of its end side 12, with the front section 14 of the airbag 2, said front section being located opposite the gas inlet opening 6 of the airbag 2. Upon further movement of the straightening ram 10, the airbag 2 is straightened in the direction of the straightening axis 11. In this case, the airbag 2 is preferably straightened out to the full extent, i.e. preferably to such an extent that limiting bands (not shown here) arranged in the interior of the airbag, between the front section 14 and the rear side of the airbag 2, are straightened to the full extent and restrict any further straightening-out movement of the airbag 2.

Figure 3C:
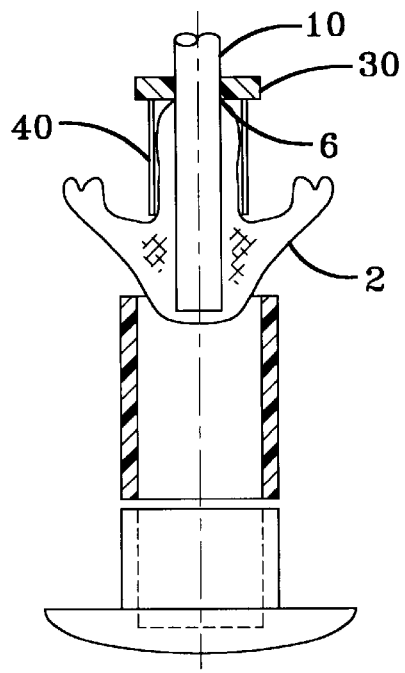

As shown in FIG. 3C, unlike the method variant explained with reference to FIG. 2, a positioning device 40 is additionally provided in the case of the third method variant. The positioning device 40 is designed in the form of individual bars or of an additional sleeve extending, as does the straightening ram 10 as well, through corresponding openings in the folding ram 30. Once the airbag 2 has been straightened out, the positioning device 40 is moved through the folding frame 30 in the direction of the straightening axis 11, in the movement direction of the straightening ram 10, and is advanced parallel to the straightening ram, starting from the gas inlet opening 6 of the airbag 2. The positioning device 40 extends essentially concentrically around the folding ram 30 and is spaced apart from the straightening ram 10 such that part of the airbag 2 can be received in the interspace between the straightening ram and positioning device 40 in order to be positioned uniformly against the straightening ram. Upon movement of the straightening device 40, the rear region of the airbag 2, i.e. that region of the airbag which surrounds the gas inlet opening 6, is positioned against the straightening ram 10.

Figure 3D:
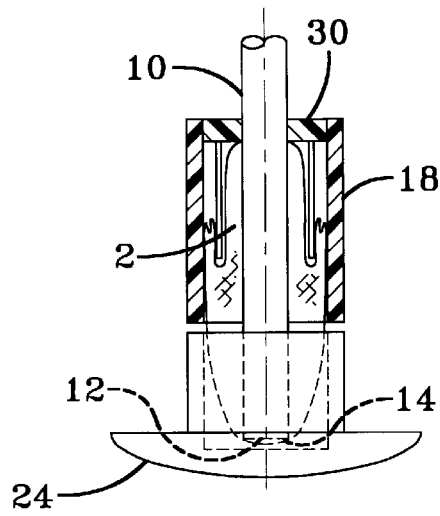
Figure 3E:
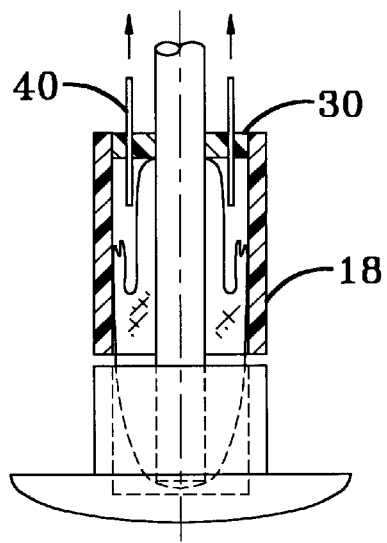
Figure 3F:
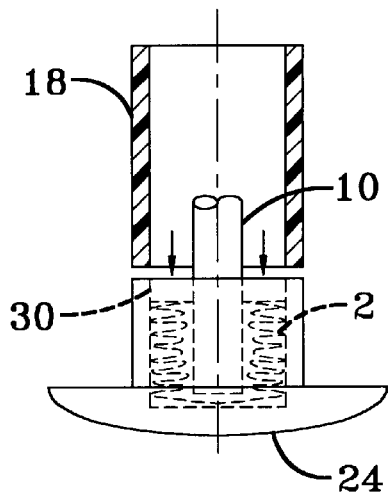
Figure 3G:
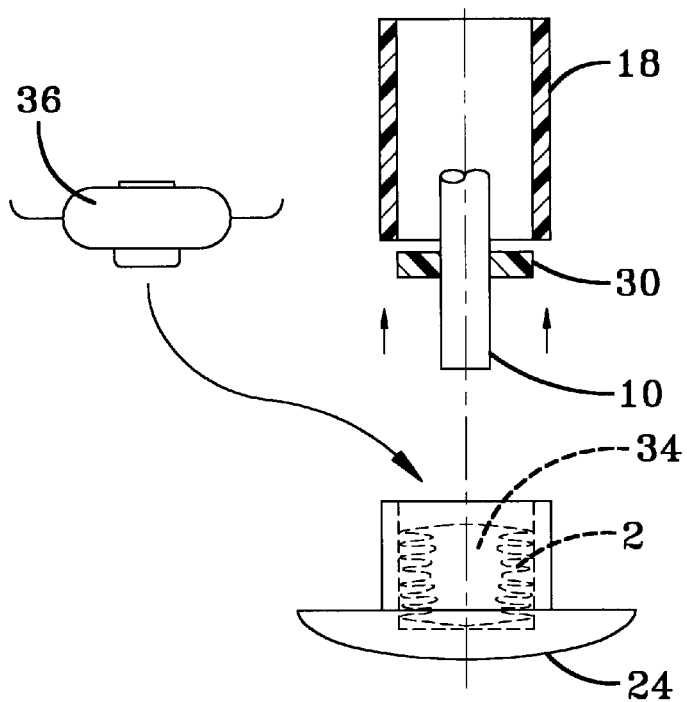

In the step illustrated in FIG. 3D, in a manner similar to FIG. 2C, the straightening ram 10, the folding ram 30, the positioning device 40 and the airbag 2 are then pushed into the guide sleeve 18. The front section 14 of the airbag 2 is secured between the end surface 12 of the straightening ram 10 and the inside of the covering 24. As is illustrated in FIG. 3E, the positioning device 40 is then drawn back again through the folding ram 30, i.e. the positioning device 40 is drawn out of the space bounded by the folding ram 30 and the guide sleeve 18. This achieves a state which corresponds to the state explained with reference to FIG. 2C, the only addition being that that part of the airbag 2 which surrounds the gas inlet opening 6 is positioned uniformly against the straightening ram 10. The folding ram 30 is then moved along the straightening ram 10, along the straightening axis 11, in the interior of the guide sleeve 18 in the direction of the covering 24. The airbag 2 is pushed together in the direction of the covering 24 and folds up randomly. In this case, the airbag 2 is simultaneously forced into the cavity 28 of the covering 24. As is illustrated in FIG. 3G, the guide sleeve 18, the straightening ram 10 and the folding ram 30 are then removed from the covering 24 with the folded airbag 2 located therein. This exposes a cavity 34, in the folded airbag 2, in which the straightening ram 10 was previously located and into which a gas generator 36, at least part of the gas generator 36, in which gas-outlet openings are located is then introduced. The action of positioning the airbag 2 against the straightening ram before the folding-up operation achieves the situation where, in the folded airbag, the region which is directed toward a vehicle occupant when the airbag is in the filled state, i.e. the front side, is located at the top or on the outside, directly behind the covering 24, and directly adjoins the space 34, in which the gas generator 36 is arranged. This region unfolds first of all when the airbag is filled with gas. Furthermore, the peripheral region of the airbag 2 is raised by the positioning device 40, which prevents jamming or catching of the airbag 2 when the folding ram 30 is introduced into the guide sleeve 18.

A fourth variant of the method according to the invention and of the apparatus according to the invention will now be disclosed with reference to FIGS. 4A to 4H, in the case of which the airbag 2, rather than being folded directly into the covering 24 is first folded and then pushed into the covering 24.

Figure 4A:
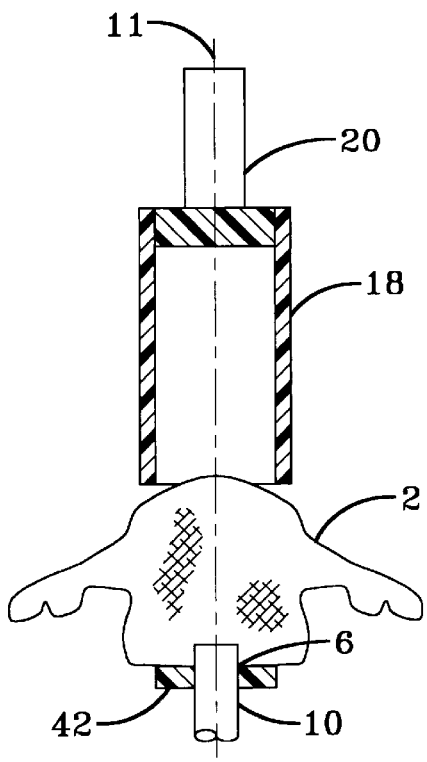
FIGS. 4A to 4H show a fourth embodiment of the apparatus and a fourth variant of the folding method according to the invention.
Figure 4B:
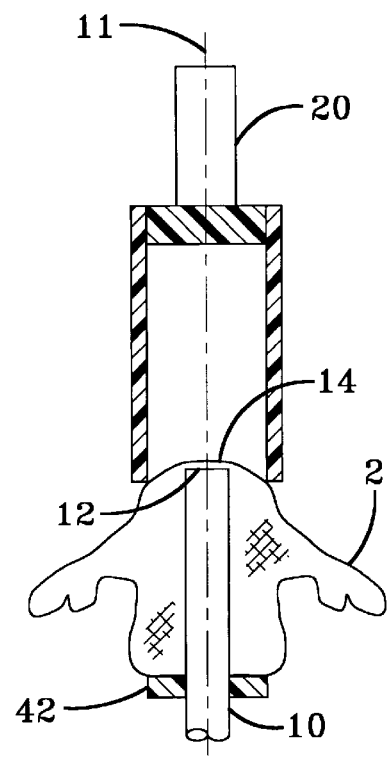
Figure 4C:
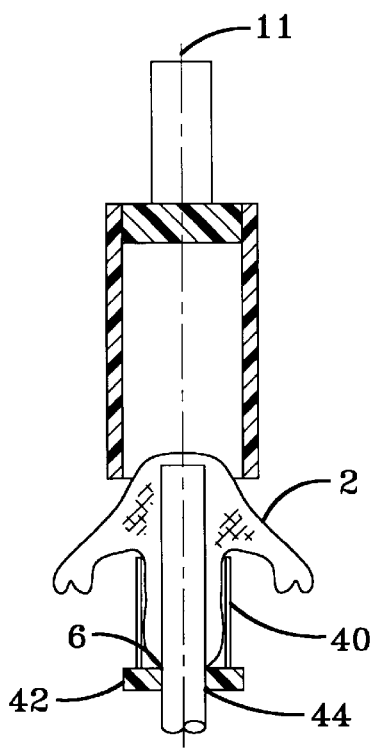
Figure 4D:
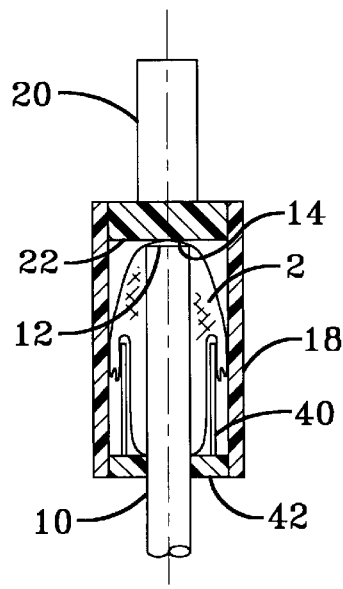
Figure 4E:
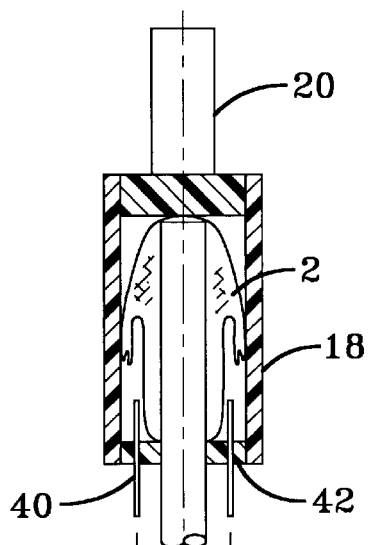
Figure 4F:
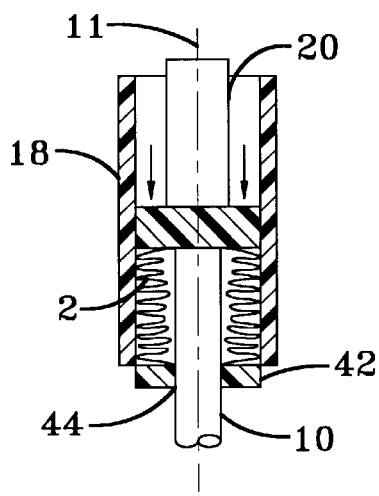
Figure 4G:
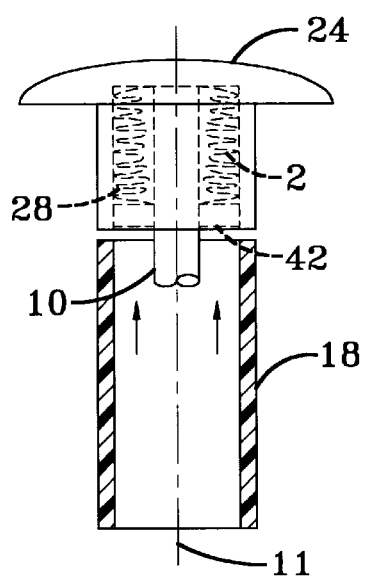
Figure 4H:
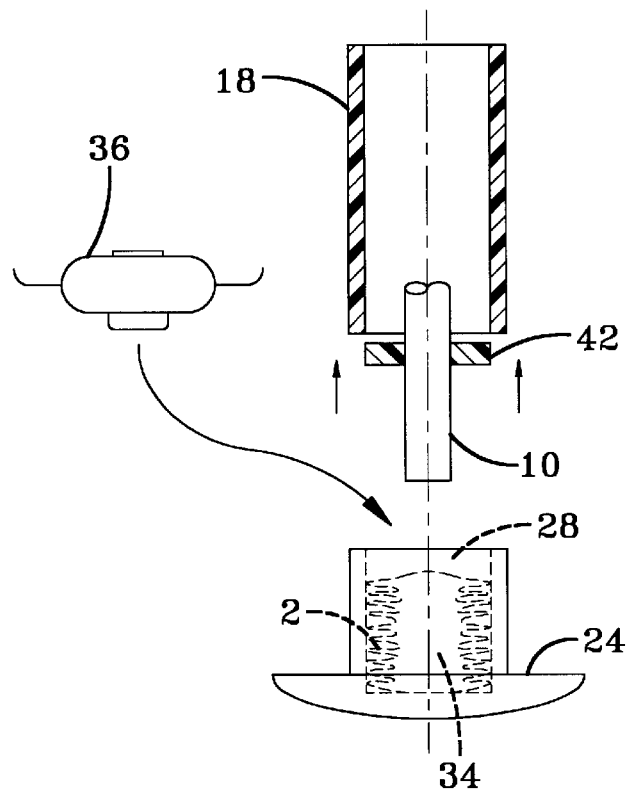

As illustrated in FIG. 4A, the airbag 2 is first fastened on a fastening plate 42 in the region of its gas inlet opening 6. The fastening plate 42 has an annular configuration and has an external diameter that corresponds essentially to the internal diameter of a guide sleeve 18. In its interior, the fastening plate 42 has an opening 44 through which a straightening ram 10 extends. Furthermore, in a manner similar to the method shown in FIG. 1, a folding ram 20 is arranged in the guide sleeve 18. In this case, the folding ram 20 is first located at a first end of the guide sleeve 18. As shown in FIG. 4B, the straightening ram 10 is then moved through the fastening plate 42 into the interior of the airbag 2, the end surface 12 of the straightening ram 10 coming into contact with the inside of the front section 14 of the airbag 2. In this case, the airbag is straightened out along the straightening axis 11. The airbag 2 is preferably straightened out to the full extent, i.e. until, on account of its outer casing or on account of limiting bands (not shown) arranged in the interior of the airbag 2, further straightening of the airbag 2 is no longer possible. According to FIG. 4C, there is also provided in this embodiment a positioning device 40 in the form of bars or of a sleeve guided through corresponding openings in the fastening plate 42, which are arranged essentially concentrically around the opening 44 for the straightening ram 10. In this case, the positioning device 40 is advanced in the direction of the straightening axis 11, parallel to the straightening ram 10, starting from the gas inlet opening 6 of the airbag 2. The rear section of the airbag 2 that extends from the gas inlet opening 6 is positioned against the straightening ram 10. As shown in FIG. 4D, the airbag 2 straightened in this way is pushed into the guide sleeve 18 with the rear section of the airbag 2 positioned against the straightening ram 10. The pushing-in operation takes place starting from that end of the guide sleeve 18 that is located opposite the end at which the folding ram 20 is first of all located. During the pushing-in operation into the guide sleeve 18, the straightening ram 10, the fastening plate 42 and the positioning device 40 essentially maintain their positions relative to one another. Following the pushing-in operation into the guide sleeve 18, the front surface 14 of the airbag 2 comes to be located between the end surface 12 and the front surface 22 of the folding ram 20. As illustrated in FIG. 4E, the positioning device 40 is then drawn out of the space bounded by the guide sleeve 18 and the fastening plate 42. The folding ram 20 is then moved toward the fastening plate 42, in the direction of the straightening axis 11, in the interior of the guide sleeve 18, the straightening ram 10 correspondingly being moved back simultaneously through the opening 44 in the fastening plate 42 (see FIG. 4F). In this case, the airbag 2 is pushed together, in the interior of the guide sleeve 18, in the direction of the fastening plate 42, and it folds randomly around the straightening ram 10. Following this folding-up operation, as illustrated in FIG. 4G, the covering 24 of the airbag module, once the folding ram 20 has been moved back and drawn out of the guide sleeve 18, is fitted on that side of the guide sleeve on which the folding ram 20 was initially located. In this case, the cavity 28 in the covering 24 is open toward the guide sleeve 18. The fastening plate 42, with the straightening ram 10 and the folded airbag 2 in the guide sleeve 18, is then moved toward the covering 24, the folded airbag being pushed into the cavity 28 of the covering 24. During this movement, the straightening ram 10 and the fastening plate 42 essentially maintain their position relative to one another. Then, as shown in FIG. 4H, the guide sleeve 18, the straightening ram 10 and the fastening plate 42 are removed from the covering 24. The folded airbag 2 remains in the cavity 28 of the covering 24. There remains in the folded airbag 2 a cavity 34, in which the straightening ram 10 was previously located and into which a gas generator 36 can now be introduced. Overall, this method variant achieves folding which corresponds essentially to the folding achieved by the method variant described with reference to FIGS. 3A to 3G.

Figure 5A:
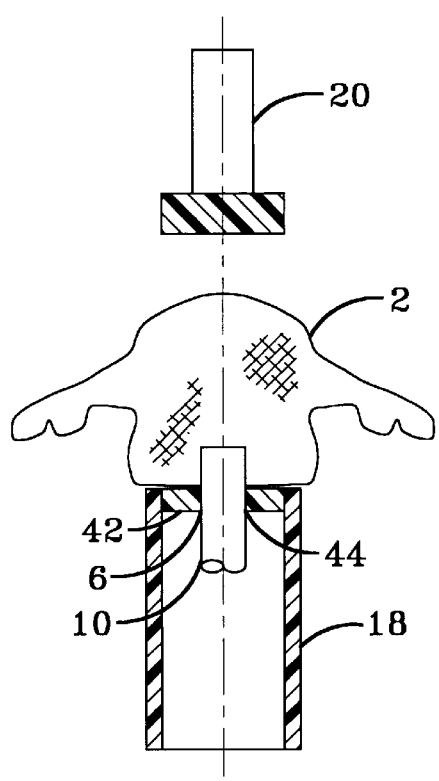
FIGS. 5A to 5G show a fifth embodiment of the apparatus and a fifth variant of the folding method according to the invention.
Figure 5B:
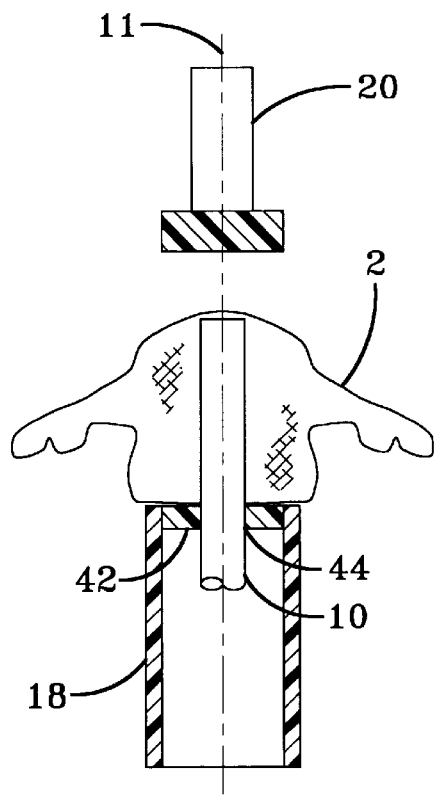
Figure 5C:
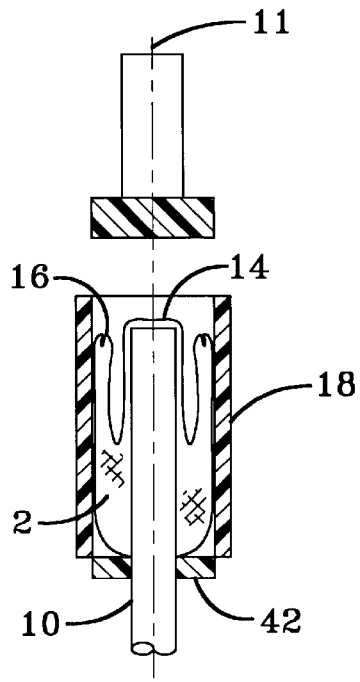
Figure 5D:
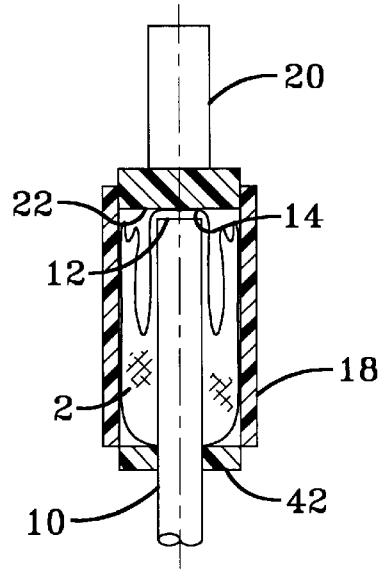
Figure 5E:
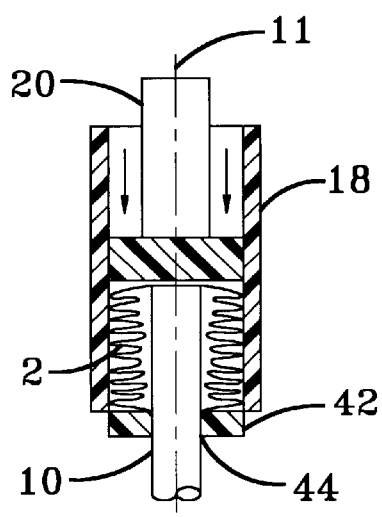
Figure 5F:
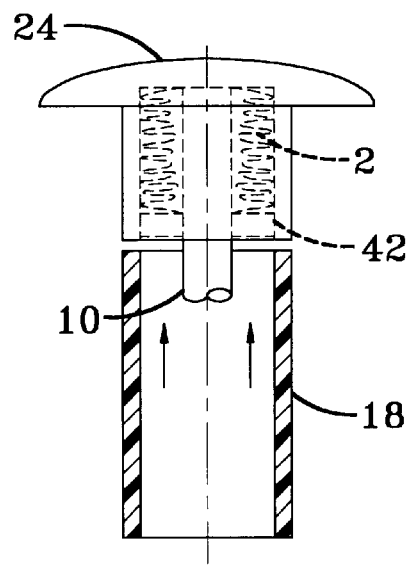
Figure 5G:
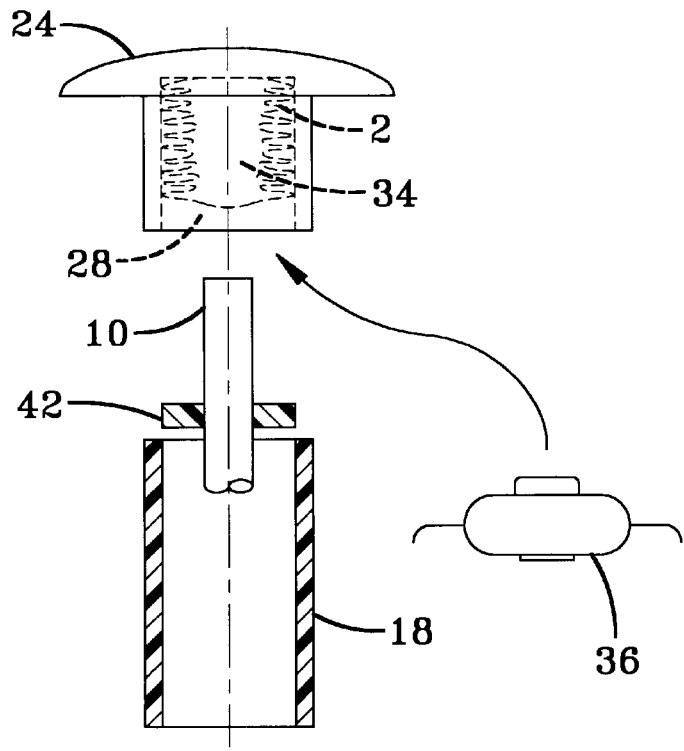

A fifth variant of the method according to the invention and of the apparatus according to the invention will now be disclosed with reference to FIGS. 5A to 5G. As shown in FIG. 5A, a fastening plate 42 is arranged in the interior of a guide sleeve 18, with the result that the fastening plate 42 is located at one end of the guide sleeve. Provided in the interior of the fastening plate 42 is an opening 44 through which a straightening ram 10 extends. The airbag 2 is first of all fastened on the fastening plate 42 in the region of its gas inlet opening 6 such that the airbag 2 is located outside the guide sleeve 18. As illustrated in FIG. 5B, the straightening ram 10 is moved through the opening 44 into the airbag 2, the end surface 12 of the straightening ram 10 coming into contact with the inside of the front surface 14 of the airbag 2. The airbag is straightened out in this case, in accordance with the method described with reference to FIGS. 4A and 4B. Then, as is illustrated in FIG. 5C, the fastening plate 42 is moved in the interior of the guide sleeve 18, in the direction of the straightening axis 11, to the opposite end of the guide sleeve 18. In this case, the straightening ram 10 maintains its position relative to the fastening plate 42, i.e. it is likewise moved into the guide sleeve 18, in which case it moves in the direction counter to its movement direction when the airbag 2 is straightened out. As a result of this movement of the fastening plate 42 and of the straightening ram 10, the airbag 2 is drawn into the guide sleeve 18 in its straightened-out state. In this case, that part of the airbag 2 which surrounds the front section 14 of the airbag is automatically positioned against the straightening ram 10. Furthermore, the regions of the peripheral seam 16 of the airbag 2 are the last to be drawn into the sleeve 18, as a result of which the airbag 2 is positioned against the straightening ram 10 in a straightened form overall and the regions of the peripheral seam 16 are arranged in the vicinity of the front section 14. A folding ram 20, which corresponds essentially to the folding ram 20 in FIG. 4, is then pushed into the guide sleeve 18, starting from that end of the guide sleeve 18 which is located opposite the fastening plate 42 (FIG. 5D). In this case, the front surface 14 of the airbag 2 comes to be located between the front surface 22 of the folding ram 20 and the end surface 12 of the straightening ram 10. As is illustrated in FIG. 5E, the folding ram 20 is moved further into the guide sleeve 18 and, at the same time, in the same movement direction the straightening ram 10 is moved out of the guide sleeve 18, through the opening 44 in the fastening plate 42. In this case, the airbag 2 is pushed together in the space between the straightening ram 10 and the guide sleeve 18, in which case it folds randomly. Then, as has been described with reference to FIG. 4, the folding ram 20 is drawn out of the guide sleeve 18, and the fastening plate 42 and the straightening ram 10 push the folded airbag 2 into a cavity 28 in the covering 24 (see FIG. 5F), which has been fitted on the guide sleeve 18. Then, in accordance with the method step described with reference to FIG. 4H, the guide sleeve 18, the fastening plate 42 and the straightening ram 10 are removed from the covering 24, the folded airbag 2 remaining in the cavity 28 in the covering 24. A gas generator 36 is then introduced into the cavity 34, which is formed in the folded airbag 2 by the straightening ram 10. These folding methods achieve the effect that when the airbag is in the folded state, the front section 14 and the regions of the peripheral seam 16 are located at the top, i.e. at the front, as seen in the deployment direction of the airbag, and directly adjacent to the cavity 34, in which the gas generator 36 is arranged. This means that, when the airbag is inflated, these regions are the first to unfold, as a result of which the necessary protective action of the airbag is achieved very quickly.

Many changes and modifications in the above described embodiments of the invention can, of course, be carried out without departing from the scope thereof. Accordingly, that scope is intended to be limited only by the scope of the appended claims.

We claim:

1. A method of folding an airbag comprising the steps of:
   (a) straightening out the airbag in the direction of a straightening axis starting from a gas inlet opening of the airbag by pushing a straightening ram into the airbag in the direction of the straightening axis, starting from the gas inlet opening, until the straightening ram comes into abutment, by way of its end surface, against the inside of a section of the airbag which is located opposite the gas inlet opening, once the straightening ram has been pushed in, a positioning device is advanced along the outside of the airbag, parallel to the straightening ram, starting from the gas inlet opening;
   (b) pushing or drawing the airbag into a single outer guide sleeve in the direction of the straightening axis; and
   (c) pushing the airbag together within the outer guide sleeve in the longitudinal direction thereof and in the direction of the straightening axis to fold the airbag, the airbag is pushed together in the outer guide sleeve by a single folding ram.

2. The method of folding an airbag as claimed in claim 1 wherein the straightening axis runs essentially perpendicularly with respect to a front surface of the airbag.

3. The method of folding an airbag as claimed in claim 1 wherein during the folding operation, the airbag is fixed preferably in the region of its gas inlet opening.

4. The method of folding an airbag as claimed in claim 1 wherein during the straightening-out operation, the straightening ram is simultaneously pushed into the outer guide sleeve.

5. The method of folding an airbag as claimed in claim 1 wherein the positioning device is a sleeve which is concentric with the straightening ram or in the form of a plurality of bars which are arranged around the straightening ram.

6. The method of folding an airbag as claimed in claim 1 wherein once it has been straightened out in the direction of the straightening axis, starting from the gas inlet opening, the airbag is drawn into the outer guide sleeve in a direction counter to the movement direction of the straightening ram when the airbag is straightened out, the straightening ram accordingly being moved along in the same direction in order to keep the airbag in its straightened-out state.

7. The method of folding an airbag as claimed in claim 1 wherein during the pushing-together operation the folding ram is moved counter to the pushing-in direction of the straightening ram, while the straightening ram is simultaneously moved back preferably at the same speed.

8. The method of folding an airbag as claimed in claim 1 wherein during the pushing-together operation the folding ram is moved in the pushing-in direction of the straightening ram, while the straightening ram is not moved at all.

9. The method of folding an airbag as claimed in claim 1 wherein following the straightening-out operation, and during the pushing together operation, the outside of that section of the airbag which butts against the end surface of the straightening ram is kept in contact with the folding ram or with part of a covering of the airbag module.

10. The method of folding an airbag as claimed in claim 1 wherein the section of the airbag against which the straightening ram butts by way of its end surface is part of the front surface of the airbag.

11. The method of folding an airbag as claimed in claim 1 wherein during the pushing-together operation a spacer is arranged in the airbag, preferably in the vicinity of the gas inlet opening.

12. The method of folding an airbag as claimed in claim 11 wherein the straightening ram assumes the function of the spacer.

13. The method of folding an airbag as claimed in claim 1 wherein the airbag is pushed out of the outer guide sleeve into an airbag housing or into a covering for an airbag module.

14. The method of folding an airbag as claimed in claim 13 wherein the airbag is pushed into the airbag housing or the covering for the airbag module during the folding operation.

15. An apparatus for folding an airbag comprising:
   (a) a straightening ram which, for the purpose of straightening out the airbag can be pushed into the latter in the direction of a straightening axis, by way of a gas inlet opening in the airbag;
   (b) a guide sleeve which is arranged coaxially with respect to the straightening ram and into which the straightening ram can be pushed along the straightening axis, the inner cross-sectional surface area of the guide sleeve being greater than the cross-sectional surface area of the straightening ram by such an extent that the airbag can be folded between the straightening ram and an inner wall of the guide sleeve;
   (c) a folding ram which, for the purpose of pushing the airbag together, can be moved within the guide sleeve along the straightening axis; and
   (d) a positioning device preferably in the form of a sleeve or of a plurality of bars which are arranged coaxially, concentrically and at a distance apart from the straightening ram and, for the purpose of positioning the airbag against the straightening ram, can be moved parallel to the straightening ram.

16. The apparatus for folding an airbag as claimed in claim 15 wherein the folding ram has a cross-sectional surface area that corresponds to the inner cross-sectional surface area of the guide sleeve.

17. The apparatus for folding an airbag as claimed in claim 15 wherein the folding ram has an opening through which the straightening ram extends.

18. The apparatus for folding an airbag as claimed in claim 15 wherein fastening devices are provided for fastening the airbag in the region of its gas inlet opening.

19. The apparatus for folding an airbag as claimed in claim 18 wherein the fastening devices are provided on the folding ram.

20. The apparatus for folding an airbag as claimed in claim 15 wherein devices are provided in order to keep an airbag housing or a covering of an airbag module in contact with the guide sleeve.

* * * * *